United States Patent Office 3,529,983
Patented Sept. 22, 1970

3,529,983
PAINTS CONTAINING CERTAIN TRIFLUOROACETATE SALTS
Joseph A. Vasta, Woodbury, N.J., assignor to E. I. du Pont de Nemours and Company, Wilmington, Del., a corporation of Delaware
No Drawing. Original application Dec. 21, 1967, Ser. No. 692,309. Divided and this application July 1, 1968, Ser. No. 741,262
Int. Cl. B05b 5/02; C08b 21/06
U.S. Cl. 106—178      6 Claims

ABSTRACT OF THE DISCLOSURE

The disclosure shows that by employing as an additive a certain type of salt compound, paints can be made which have improved pigment-wetting and flow properties and which are suitable for application by electrostatic spray techniques; the salt compound can be made by reacting trifluoroacetic acid with a tertiary amine compound obtained from the reaction between a primary amine (e.g., lauryl amine) and an ester of the formula

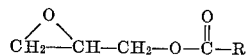

wherein R is a branched chain $C_8$–$C_{10}$ alkyl group.

CROSS REFERENCE TO RELATED APPLICATIONS

This is a division of my patent application Ser. No. 692,309, filed Dec. 21, 1967, now U.S. Pat. 3,413,322; the latter was a continuation-in-part of my patent application Ser. No. 414,434, filed Nov. 27, 1964, and now abandoned.

BACKGROUND OF THE INVENTION

This invention relates to paints and other film-forming compositions containing as an additive a member of a certain class of salt compounds. Embodiments of the invention especially concern paints and the like which are suitable for application by electrostatic spray techniques.

It is known that to achieve satisfactory application of a liquid coating composition by electrostatic spray techniques, the composition must have an electrical resistance of about 100,000–500,000 ohms. The many coating compositions useful for protective and decorative purposes which have higher electrical resistances must be treated to reduce their electrical resistance if application by this method is desired. It is a customary expedient to increase the conductivity (reduce the resistance) of these compositions by addition of polar solvents or other additives, but the known additives have been unsatisfactory for a variety of reasons.

For example, most polar solvents are costly; and the less expensive ones, such as methanol, are too volatile for satisfactory use. Many additives which have been used to reduce electrical resistance of paints are unsatisfactory because of their adverse effects on the quality of the coating composition itself. In some instances these so-called electrostat depressants are effective but only for an unduly short period of time. Some known additives depress the electrical resistance of a composition quite well initially, but in a few days or weeks the electrical resistance rises again to exceed the highest level permissible for electrostatic spraying. Other additives are extremely limited in their utility for this purpose due to their low solubility in the preferred solvents of the coating compositions.

SUMMARY OF THE INVENTION

The present invention provides a liquid coating composition containing a film-forming component and about 0.5–10 pounds of a salt compound per 100 gallons of said composition, said salt compound being a trifluoroacetate salt of a compound from the group having the structural formulas

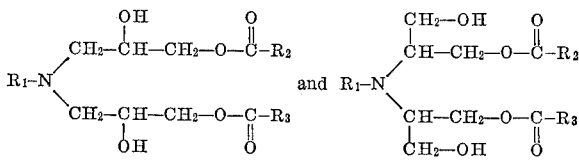

wherein $R_1$ is a radical selected from the group consisting of $C_1$–$C_{12}$ alkyl, $C_4$–$C_7$ alicyclic, phenyl, $C_1$–$C_{12}$ alkyl substituted phenyl, and phenyl substituted $C_1$–$C_{12}$ alkyl, and $R_2$ and $R_3$ are branched chain $C_8$–$C_{10}$ alkyl groups.

DESCRIPTION OF PREFERRED EMBODIMENTS

With reference to $R_1$ of Formulas I and II above, lauryl is a preferred alkyl group. $R_1$ can also be one of the other groups listed above, including an alicyclic group (e.g., cyclohexyl), an aryl group (e.g., phenyl) an alkaryl group (e.g., tolyl), or an aralkyl group (e.g., benzyl). The salt compound is a trifluoroacetate salt of either or both of the compounds of Formulas I and II.

The structure of the salt of Formula I can be illustrated as follows:

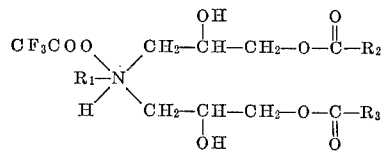

The salt compound can be prepared by reacting trifluoroacetic acid with a tertiary amine compound of Formula I, Formula II, or mixtures of such formulas. These tertiary amines can be prepared by reacting a suitable primary amine having the formula $R_1NH_2$, such as lauryl amine, with a glycidyl ester having the formula

where R is a branched chain $C_8$–$C_{10}$ alkyl group. Preparation of such compounds is known in the art. The amine is reacted with the glycidyl ester at normal atmospheric pressure and at elevated temperature, usually greater than about 60° C. and preferably in the range of about 60–150° C. A reaction time of about 0.5 to 4 hours is usually sufficient to produce the tertiary amines.

Many known paints and other liquid coating compositions which are not useful for application to substrates by electrostatic spray techniques because of insufficient electrical conductivity can be converted to very useful electrostatic spray compositions by admixing therewith a small amount of the salt compound. About 0.5–10.0 pounds of the salt compound per 100 gallons of coating composition is usually sufficient to obtain the desired level of electrical conductivity Coating compositions of the present invention, because of the presence of the novel salt compound, have a decided tendency towards improved pigment-wetting properties and improved flow properties. The compositions also tend to retain suitable conductivity for electrostatic spray application over extended periods of time.

A preferred embodiment of the coating composition of this invention is one that is formulated for use as a baking enamel; such a composition contains enough of any suitable known pigment to give the desired color, enough of the salt compound to give the desired electrical conductivity, and enough of any suitable known baking-enamel type of film-forming component adapted to form a coating of suitable durability when the applied coating is dried or cured in an oven or other heat zone properly heated to an elevated temperature. The composition will of course also contain a volatile organic solvent or other suitable liquid medium in an amount sufficient to provide the desired viscosity. The proportions of the various known ingredients will be generally the same as is known in the art to be satisfactory. Among the useful baking-enamel type film-formers are alkyd resins, oil-modified alkyd resins, urea and melamine formaldehyde resins, styrene/glycidyl ester copolymers and the like.

Another preferred embodiment of the coating composition is one that is formulated for use as a lacquer; such a composition can be either nonpigmented or it can contain enough of any siutable known pigment to give the desired color. Enough of the novel salt compound is added to give the desired electrical conductivity, enough of a volatile organic solvent or the like is added to give the desired viscosity, and enough of any suitable known lacquer-type film-forming component is used which forms a coating of suitable durability when the coating is dried at or near ordinary room temperature. The proportions of the various conventional or known ingredients of the lacquer, used in combination with the trifluoroaceate salt compound, will be generally the same as is known in the art to be satisfactory. Among the useful lacquer-type film forming components are cellulose nitrate, cellulose acetate butyrate, polymethyl methacrylate and polyvinyl chloride.

The examples which follow are given for the purpose of illustrating the invention. All quantities shown are on a weight basis unless otherwise indicated.

EXAMPLE 1a

A salt compound of the present invention is prepared as follows:

Lauryl amine (205 parts) and 490 parts "Cardura" E (a mixed glycidyl ester of a synthetic tertiary carboxylic acid, having the formula

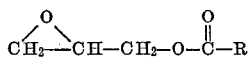

where R is a tertiary aliphatic hydrocarbon group of 8–10 carbon atoms) are charged into a reaction vessel and heated at 120° C. for two hours. The resulting tertiary amine product is a mixture of compounds having the structures of Formulas I and II in which $R_1$ is lauryl, and $R_2$ and $R_3$ are each $C_8$–$C_{10}$ tertiary aliphatic alkyl groups. The amine product is separated and recovered by conventional means. An analysis of the recovered tertiary amine mixture is presented below:

|  | Calculated | Found |
|---|---|---|
| Percent non-volatile solids | 100 | 98.75 |
| Percent hydroxyl | 4.8 | 4.24 |
| Percent nitrogen | 2.0 | 2.03 |

Glacial trifluoroacetic acid (265 parts) is mixed with 35 parts of the tertiary amine mixture prepared above, and the resulting mixture is heated at 60° C. for one hour. The trifluoroacetate salt of the tertiary amine is obtained.

EXAMPLE 1b

A baking enamel is prepared using the following ingredients:

PART A

First portion

Parts by wt.
Industrial xylol—10° _____ 156.4
High solvency petroleum naphtha _____ 156.2
"Cardura" E (as in Example 1a) _____ 117.5

Second portion

Styrene _____ 239.1
Acrylic acid _____ 41.9
Di-tertiary butyl peroxide _____ 4.0
Benzyltrimethylammonium hydroxide— 40% solution in methanol _____ 2.0

Third portion

Butanol _____ 7.9

The first portion is charged into a reactor and heated to reflux temperature.

The ingredients of the second portion are mixed and then added to the reactor over a two-hour period The resulting solution is then held at reflux temperature for three hours.

Heat is withdrawn and the solution is cooled and thinned with the third portion to give a copolymer solution containing 50% solids, and having a Gardner Holdt viscosity of T.

The resulting polymer has an acid number of 15; it is the copolymerization and esterification product of the following reactants in the listed proportions:

Percent
Styrene _____ 60
"Cardura" E _____ 29
Acrylic acid _____ 11
_____
100

The above polymer is used to make a baking enamel using the following formulation:

PART B

First portion

Parts by wt.
Part A copolymer solution—50% polymer content _____ 87.45
Industrial xylol—10° _____ 65.59
Titanium dioxide pigment—rutile _____ 284.21

Second portion

Part A copolymer solution—50% polymer content _____ 291.50
Melamine-formaldehyde resin solution—55% in butanol _____ 227.60

Third portion

Industrial xylol—10° _____ 43.65

Portion one of Part B is ground in a sand mill, and the second and third portions are then blended into this mill base.

The trifluoroacetate salt of Example 1a (10 parts) is intimately mixed with 1000 parts of the baking enamel thus prepared. Prior to addition of the salt the enamel has an electrical resistance of about 850,000 ohms, but after adding the salt its electrical resistance is 175,000 ohms. The enamel is readily applied to metal substrates by known electrostatic spray techniques. Aging of the enamel at 120° F. for four weeks resulted in no change in electrical resistance. This was in contrast with another portion of the enamel treated with a commercially available electrostat depressant, believed to be a quaternary ammonium salt; although the electrical resistance of this comparative sample of enamel was quite well depressed initially, it returned during the four week period to its original electrical resistance, which was much too high to permit its application by electrostatic spraying.

When another portion of the enamel is treated with a like amount of the tertiary amine obtained in Example 1a instead of using the salt, the electrical resistance is not nearly as well depressed initially, and after the four week aging period, the electrical resistance of this comparative sample of enamel is too high for satisfactory electrostatic spray application.

When Example 1b is repeated except the trifluoroacetate salt is added to Portion one of Part B before the sand mill grinding step, the presence of the salt provides improved pigment-wetting, and a more uniformly ground pigment is obtained. The resulting enamel has improved flow properties, and it is well suited for electrostatic spray application.

I claim:

1. A liquid coating composition containing a film-forming component and about 0.5–10 pounds of a salt compound per 100 gallons of said composition, said salt compound being a trifluoroacetate salt of a compound from the group having the structural formulas

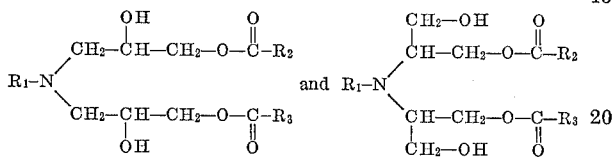

wherein $R_1$ is a radical selected from the group consisting of $C_1$–$C_{12}$ alkyl, $C_4$–$C_7$ alicyclic, phenyl, $C_1$–$C_{12}$ alkyl substituted phenyl, and phenyl substituted $C_1$–$C_{12}$ alkyl, and $R_2$ and $R_3$ are branched chain $C_8$–$C_{10}$ alkyl groups.

2. A composition according to claim 1 wherein $R_1$ is lauryl.

3. A composition according to claim 1 wherein said composition is formulated for use as a baking enamel.

4. A composition according to claim 3 wherein said film-forming component is at least one member of the group consisting of alkyd resins, oil-modified alkyd resins, urea formaldehyde resins, melamine formaldehyde resins, and styrene/glycidyl ester copolymers.

5. A composition according to claim 1 wherein said composition is formulated for use as a lacquer.

6. A composition according to claim 5 wherein said film-forming component is at least one member of the group consisting of cellulose nitrate, cellulose acetate butyrate, polymethyl methacrylate and polyvinyl chloride.

References Cited
UNITED STATES PATENTS 2,856,420  10/1958  Crawford _____ 260—487
3,399,075   8/1968  Spiller _____ 117—93.4

MORRIS LIEBMAN, Primary Examiner

H. H. FLETCHER, Assistant Examiner

U.S. Cl. X.R.

106—186, 189, 190, 193; 117—93.4; 252—62.1, 500; 260—22, 39, 40, 41, 404, 408, 2, 67.6, 69